Aug. 13, 1935.　　　G. HOLST ET AL　　　2,011,519
ELECTROLYTIC CELL
Filed March 1, 1933
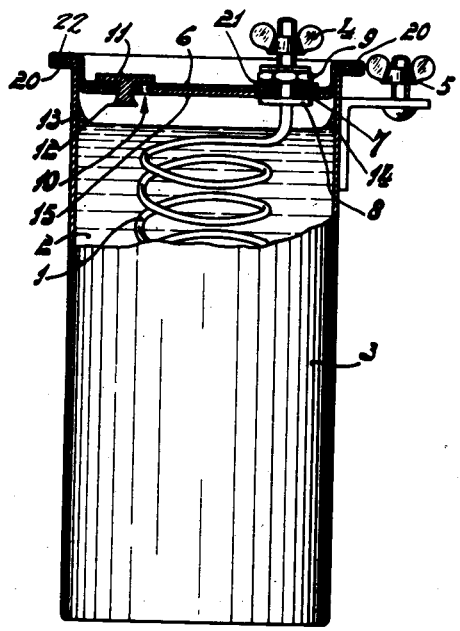
Inventors:
G. Holst and
A. E. van Arkel,
by [signature]
Atty.

Patented Aug. 13, 1935

2,011,519

UNITED STATES PATENT OFFICE 2,011,519

ELECTROLYTIC CELL

Gilles Holst and Anton Eduard van Arkel, Eindhoven, Netherlands, assignor to N. V. Philips' Gloeilampenfabrieken, Eindhoven, Netherlands Application March 1, 1933, Serial No. 659,186
In the Netherlands March 5, 1932

6 Claims. (Cl. 175—315)

Our invention relates to electrolytic cells, such as electrolytic rectifiers, electrolytic condensers, storage batteries, and the like, which cells comprise a closed container in which is provided an electrolyte and one or more electrodes, and in which during the operation of the cell gases are developed, for the escape of which provision must be made.

We shall describe our invention by way of example with reference to electrolytic condensers, to which it is particularly well adapted.

Electrolytic condensers comprise a container, an electrolyte, and one or more electrodes, of which at least one is of filmforming metal, and which is covered with an electrolytically formed film. To prevent contamination and evaporation of the electrolyte the container as a rule is fully closed, and in addition is sealed in liquid and air-tight manner. During the operation of the condenser, however, gases are liberated at the electrodes, and for their escape one or more ventholes are usually provided in some part of the container, generally on the top. Such apertures are usually closed by valves which open intermittently, namely, when during the operation, the accumulation of the liberated gases produces sufficient pressure to lift the valve.

As long as the valve is closed it prevents the passage of liquid electrolyte from the container to the outside. However, when the valve opens the escaping gases carry with them some of the liquid electrolyte. This is objectionable not only because it results in a loss of the electrolyte, but also because the electrolyte upon its escape wets and damages adjacent objects on which it may deposit. This drawback is especially pronounced in the case of devices, such for instance, as radio receiving sets, in which other parts are mounted in close proximity to the electrolytic condensers, the wetting of which by the electrolyte may seriously interfere with the proper operation of the device.

We have found that the escape of the electrolyte is largely due to the creepage of the electrolyte, which consists in the electrolyte creeping upwardly along the walls of the container towards the venthole due to the capillary action of the container walls. As the electrolyte thus reaches the venthole it is forced out by the escaping gases whenever the valve opens.

According to our invention this creepage and the consequent escape of the electrolyte is eliminated by providing in the creepage path of the electrolyte, thus between the surface of the liquid electrolyte and between the venthole, a zone through which the electrolyte cannot pass and which completely intercepts this path. More particularly we provide, in the creepage path of the electrolyte on the inside wall of the container or on the bottom side of the cover, or both, a coating of a substance which is not moistened by the electrolyte; or in other words, a coating to which the electrolyte cannot adhere by capillary action. Various waxes may provide suitable coatings for the above purpose, and while it is preferable to provide such a coating along the entire creeping path, this is not necessary as long as such coating intercepts the creeping path in its whole cross-section.

Our invention will be more fully described with reference to the accompanying drawing, which is a side view, partly in section, of an electrolytic condenser embodying our invention.

In the drawing, 1 is an electrode of film-forming metal, for instance aluminium, tantalum, or the like, and which is provided with an electrolytically-formed oxide film. While the electrode 1 is shown as a coiled wire it should be well understood that any desired electrode construction may be used.

The other electrode is formed by the electrolyte 2, which may, for instance, be an aqueous solution of borax and boric acid or other suitable solution used in such devices. The cylindrical container 3, which is closed at its bottom and open at its top, is filled almost up to its top with the electrolyte 2 and constitutes a supply conductor for the same. The container 3 may be of either film-forming or non-film-forming metal, and is provided at its upper end with a flange 20.

The electrode 1 and the container 3 may be provided with suitable connecting terminals 4 and 5 respectively.

At its top the container 3 is closed by a suitable cover shown as a re-entrant metal lid 6, which is provided with a flange 22 which is crimped in liquid and air-tight manner around the flange 20 of the container 3.

The end of electrode 1 projects through the cover 6 and is insulated therefrom by means of the washer 21 above, and the gasket 7 below the cover 6, both of which consist of insulating material. The gasket 7 is pressed against the cover 6 by a flange 8 provided on the electrode 1, when a nut 9 engaging the threaded end portion of the electrode 1 on the top side of the cover 6 is tightened. The gasket thereby provides for a liquid and airtight seal between the electrode 1 and the cover 6.

The cover 6 is provided with a venthole 10, which is covered by the cap 11 of a mushroom flap-valve, the slightly tapered stem 12 of which is forced in liquid and air-tight manner through an aperture of the cover 6. When the developed gases attain sufficient pressure they lift the cap 11 of the mushroom valve and the gases escape.

It is indicated at 13 and 14 the manner in which the electrolyte creeps upwardly along the inside walls of the container. In the case according to the invention, the bottom side of the cover 6 is provided with a layer of wax 15, for instance, with a coating of a suitable mineral wax, which is not moistened by the electrolyte and along which the electrolyte thus cannot creep. The electrolyte is thus prevented from reaching the venthole 10 and cannot escape when the valve is opened. Preferably the wax layer 15 also extends into the venthole, such being indicated in the drawing.

Instead of providing such a coating at the bottom side of the cover, the end portion of the container which extends upwardly from the surface of the electrolyte may be provided with such coating or preferably, the whole creepage path may be so coated.

While we have described our invention as applied to specific embodiments and as applied to electrolytic condensers, we do not wish to be limited to the examples given and to such application, but desire the appended claims to be construed as broadly as permissible in view of the prior art.

What we claim is:

1. An electrolytic cell comprising a sealed container and an electrolyte therein, a venthole provided on said container and a valve cooperating with said venthole, the inside portions of the container which extend from the surface of the electrolyte to the venthole forming a creepage path for the electrolyte, and a coating of a substance which is not moistened by the electrolyte provided on the surface of the walls at the inside of said container and interrupting said creepage path while leaving the venthole unobstructed.

2. An electrolytic condenser comprising a sealed metallic container and an electrolyte therein and filling the container close to the top thereof, an electrode of film-forming metal immersed in said electrolyte, a venthole provided on the top portion of the container, and a valve cooperating with said hole, those inside wall portions of the container which extend upwardly from the surface of the electrolyte to the venthole forming a creepage path for the electrolyte, and a coating consisting of a substance which is not moistened by the electrolyte provided on said wall portions and interrupting said creepage path, while leaving the venthole unobstructed.

3. An electrolytic condenser, comprising a metallic container provided at its top with a cover, a venthole in said cover, and a valve cooperating with said venthole, an electrolyte filling said container with an interspace left between the surface of the electrolyte and the cover, an electrode of film-forming material immersed in said electrolyte, and a coating applied to the inner surface of that portion of the container which extends upwardly from the surface of the electrolyte to the cover, said coating consisting of a substance which is not moistened by the electrolyte, while leaving the venthole unobstructed.

4. An electrolytic cell comprising a sealed container and an electrolyte therein, a venthole for the escape of gases, a cooperating valve to close said hole, and a coating of wax provided on the inner surface of those wall portions of the container which extend from the surface of the electrolyte to the venthole, while leaving the venthole unobstructed.

5. An electrolytic condenser comprising a container and a top cover therefor, a venthole in said cover, and a valve cooperating with said venthole, an electrolyte in said container, and a coating of wax provided on the inner surface of the cover, said coating also extending into said venthole, while leaving the same unobstructed to the passage of escaping gases.

6. An electrolytic condenser comprising a metallic container and a liquid electrolyte therein, a metallic closure member for said container, a venthole in said closure member and a valve cooperating with said venthole to open same when the pressure in the cell reaches a predetermined value, and a coated layer covering the inner surfaces of said closure member, and of that portion of the container which extends from the electrolyte to the closure member, said layer being of a material to which the electrolyte does not adhere and extending over the entire path between the electrolyte and the venthole.

GILLES HOLST.
ANTON EDUARD van ARKEL.